United States Patent
Stevens, Jr. et al.

(10) Patent No.: US 7,454,603 B2
(45) Date of Patent: Nov. 18, 2008

(54) METHOD AND SYSTEM FOR LINKING FIRMWARE MODULES IN A PRE-MEMORY EXECUTION ENVIRONMENT

(75) Inventors: William A. Stevens, Jr., Folsom, CA (US); Andrew J. Fish, Olympia, WA (US); Kirk D. Brannock, Olympia, WA (US); Robert P. Hale, Portland, OR (US); Ramamurthy Krithivas, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 424 days.

(21) Appl. No.: 10/073,495

(22) Filed: Feb. 11, 2002

(65) Prior Publication Data

US 2003/0154368 A1 Aug. 14, 2003

(51) Int. Cl.
*G06F 9/00* (2006.01)
(52) U.S. Cl. .............................. 713/1; 713/2; 713/100; 717/174
(58) Field of Classification Search .................... 713/1, 713/2, 100; 717/174
See application file for complete search history.

(56) References Cited

U.S. PATENT DOCUMENTS

| | | | |
|---|---|---|---|
| 5,671,413 A | | 9/1997 | Shipman et al. |
| 5,752,032 A | * | 5/1998 | Keller et al. ................. 719/311 |
| 5,943,673 A | * | 8/1999 | Felouzis et al. ........... 707/104.1 |
| 5,999,989 A | * | 12/1999 | Patel .............................. 710/1 |
| 6,081,890 A | * | 6/2000 | Datta ............................. 713/1 |
| 6,173,350 B1 | * | 1/2001 | Hudson et al. .............. 710/100 |
| 6,199,159 B1 | | 3/2001 | Fish |
| 6,324,644 B1 | * | 11/2001 | Rakavy et al. ................. 713/1 |
| 6,353,924 B1 | * | 3/2002 | Ayers et al. ................. 717/128 |
| 6,381,693 B2 | | 4/2002 | Fish |
| 6,633,976 B1 | * | 10/2003 | Stevens ......................... 713/2 |
| 6,708,271 B1 | * | 3/2004 | Sasaki et al. ................... 713/1 |
| 2001/0007119 A1 | * | 7/2001 | Katayama et al. .......... 711/103 |
| 2002/0174353 A1 | * | 11/2002 | Lee ............................ 713/193 |

FOREIGN PATENT DOCUMENTS

| | | |
|---|---|---|
| WO | PCT/US 03/02376 | 12/2003 |
| WO | PCT/US03/02376 | 12/2004 |

OTHER PUBLICATIONS

Stevens, Curtis; "EFI A BIOS Vendor's Perspective"; Sep. 1, 1999; part of presentation "Extensible Firmware Interface: booting the new generation of Intel Architecture platforms".*
Hsiung, Harry, "EFI Training Session", Oct. 10, 2000.*
"IEEE 100 The Authoritative Dictionary of IEEE Standards Terms", Seventh Edition, 2000.*

* cited by examiner

*Primary Examiner*—Tse Chen
(74) *Attorney, Agent, or Firm*—Blakely, Sokoloff, Taylor & Zafman LLP

(57) ABSTRACT

A BIOS includes a core and multiple modules. The modules include both those that are platform specific and those that are not platform specific. Each module has a standard interface that allows the core (or other module) to call the module. A platform vendor constructs a BIOS by selecting modules from one or more vendors, which when executed can select modules that are suitable for the platform the BIOS resides in.

15 Claims, 10 Drawing Sheets

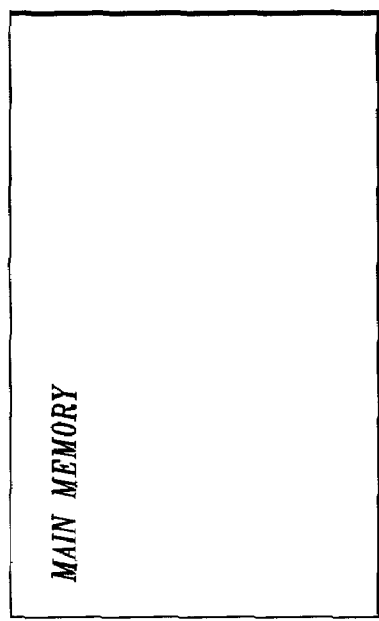
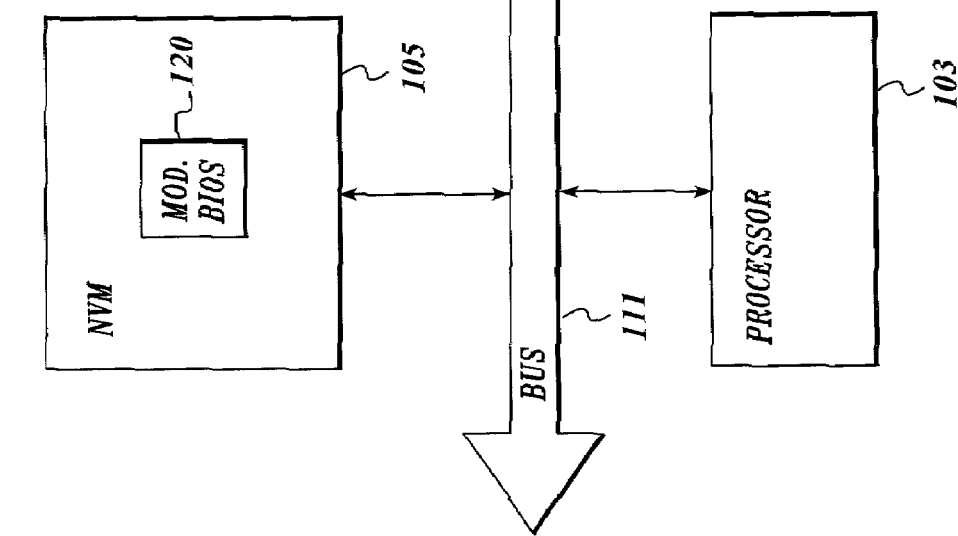

```
IMPORT TABLE

I_SERVICE-1
        -NAME
        -FLAGS
        -ADDRESS (START ADDR.+OFFSET)

I_SERVICE-2
        -NAME
        -FLAGS
        -ADDRESS
            •
            •
            •
    I_SERVICE-X
        -NAME
        -FLAGS
        -ADDRESS
```

*Fig. 7A*

```
EXPORT TABLE

E_SERVICE-1
        -NAME
        -FLAGS
        -OFFEST

E_SERVICE-2
        -NAME
        -FLAGS
        -OFFSET
            •
            •
            •
    E_SERVICE-Y
        -NAME
        -FLAGS
        -OFFSET
```

METHOD AND SYSTEM FOR LINKING FIRMWARE MODULES IN A PRE-MEMORY EXECUTION ENVIRONMENT

FIELD OF THE INVENTION

The present invention relates generally to computer systems, and in particular, relates to computer systems' basic input output system (BIOS).

BACKGROUND INFORMATION

The BIOS includes a collection of executable programs and data to initialize other components of a computer system. Upon turning on (or alternatively resetting) the computer system, the computer system executes the BIOS from nonvolatile memory such as read-only memory (ROM) chip(s), or equivalent. In many computer systems, the BIOS loads all or part of the operating system, which is usually stored on the computer system's hard disk. Alternatively, the operating system may be loaded from a compact disc (CD) ROM or a floppy disk. The loaded operating system may subsequently call a BIOS routine or component.

The BIOS (also referred to herein as firmware) in a pre-memory execution environment is usually tightly bound object code that is built for a specific configuration or system design (also referred to herein as a platform). That is, different platforms typically have different BIOSs. More particularly, the BIOS typically includes code (also referred to herein as firmware modules) for providing certain functions or services, which in turn may depend on the platform. For example, the firmware module for a particular service may be different for a platform with a Pentium III® processor compared to one with a Pentium IV® processor. Thus, a BIOS vendor will typically develop several BIOSs to support various platforms, which undesirably increases costs in testing, maintaining and documenting the multiple BIOSs.

Further, the traditional development process requires software developers to compile and link their firmware module with the main firmware executable code. Additionally, the process often requires the software developer to customize the firmware module for each vendor's main firmware executable code. This undesirable process requires the developer to test the firmware module for proper operation in each firmware environment, which tends to increase development time and costs.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 1 is a block diagram illustrating a computer system having a modular BIOS, according to one embodiment of the present invention.

FIGS. 7A and 7B are diagrams respectively illustrating import and export tables, according to one embodiment of the present invention.

DETAILED DESCRIPTION OF THE ILLUSTRATED EMBODIMENTS

Figure 2:
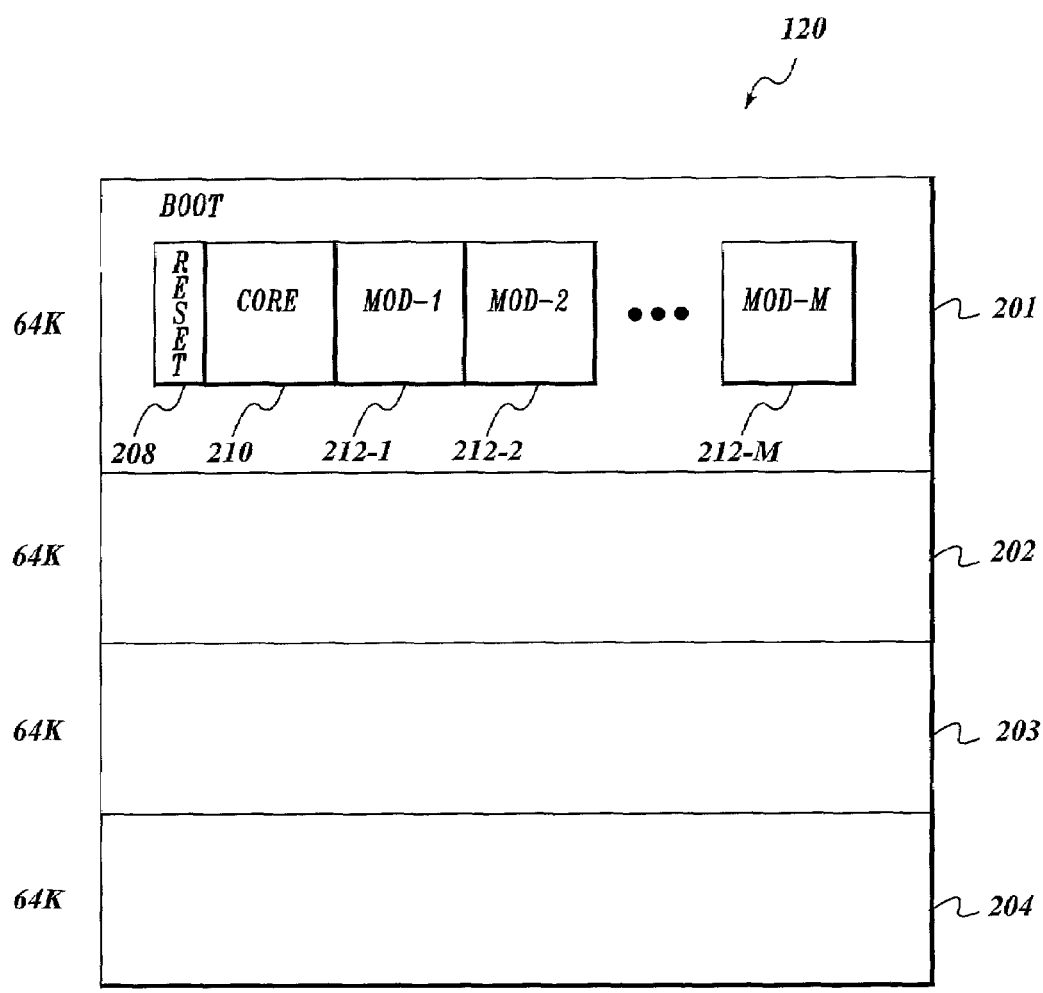
FIG. 2 is a diagram illustrating a modular BIOS, according to one embodiment of the present invention.

FIG. 1 illustrates a computer system 100, in accordance with one embodiment of the present invention. Computer system 100 includes a processor 103, a nonvolatile memory 105, a main memory 107, devices 109-1 through 109-N, and a bus 111. In addition, computer system 100 includes a modular BIOS 120 stored in nonvolatile memory 105.

Processor 103 may be a conventional microprocessor, such as, but not limited to, an Intel x86 or Pentium family microprocessor, a Motorola family microprocessor, and the like. Nonvolatile memory 105 can be implemented in several ways. For example, nonvolatile memory 105 can implemented using devices that include, but are not limited to, erasable programmable read-only memory (EPROM) devices, electrically erasable programmable read-only memory (EEPROM) devices, Flash memory devices, and the like. Main memory 107 can be implemented using devices that include, but are not limited to, dynamic random access memory (DRAM), static random access memory (SRAM), and the like. Devices 109-1 to 109-N are devices typically used in a computer system such as, but are not limited to, a display, monitor, keyboard, hard disk drive, CD ROM drive, network interface card (NIC), sound card, printer, scanner, pointing device (e.g., mouse, trackball, touch pad) and the like. Main memory 107, nonvolatile memory 105, processor 103, and device(s) 109-1 to 109-N are all coupled to bus 111.

It is appreciated that computer system 100 is one example of many possible computer systems that have different architectures. For example, computer systems that utilize the Microsoft Windows operating system in combination with Intel microprocessors often have multiple buses, one of which may be considered a peripheral bus. Network computers may also be considered as computer systems that may be used with the present invention. In addition, handheld or palmtop computers, which are sometimes referred to as personal digital assistants (PDAs), may also be considered as computer systems that may be used with the present invention. A typical computer system will usually include at least a processor 103, a main memory 107, a nonvolatile memory 105, and a bus 111.

It will also be appreciated that in one embodiment, computer system 100 is controlled by operating system software that includes a file management system, such as a disk operating system, which is part of the operating system software. For example, one embodiment of the present invention utilizes Microsoft Windows as the operating system for computer system 100. In another embodiment, other operating systems include, but are not limited to, an Apple Macintosh® operating system, a Microsoft Windows® operating system, a Unix operating system, a Palm® operating system, and the like may be used in accordance with teachings of the present invention. In general, the particular operating system that is utilized in computer system 100 will be based on at least in part upon the specific architecture, chips or chipsets that are utilized in computer system 100.

FIG. 2 illustrates BIOS 120 (FIG. 1) residing in nonvolatile memory 105 (FIG. 1), according to one embodiment of the present invention. In this embodiment, nonvolatile memory 105 is divided into blocks 201-204, each having a size of 64 KBytes. In this embodiment, block 201 is the boot block. Boot block 201 includes a reset vector 208, a core 210, and firmware modules 212-1 to 212-M. Blocks 202, 203, and 204 are used to store other components of BIOS 120 and to provide some non-volatile storage during execution of BIOS 120.

The Reset vector 208 is the first memory location read by processor 103 (FIG. 1) after a power on or reset. In one embodiment, reset vector 208 causes processor 103 to execute instructions commonly referred to as a POST (power on self test). In one embodiment, the operation flow begins to execute core 210. Core 210 serves as a scheduler or dispatcher for firmware modules 212-1 to 212-M. Core 210 also contains instructions for a core set of services. These core services include, but are not limited to, location of platform variables, management of the boot mode, common tasks such as copying and zeroing memory. Each firmware module 212-1 to 212-M contains instructions associated with a service for one or more components that may be included in computer system 100. In accordance with the present invention, each firmware module has a common interface component for interfacing with core 210. In addition, a firmware module may include a common interface for interfacing with another firmware module. As will be further described below, these features allow for a BIOS that includes core 210 and firmware modules 212-1 to 212-M (i.e., a modular BIOS) to be interoperable with multiple platforms in a manner that is somewhat analogous to how an operating system and drivers allow a computer system to interoperate with multiple peripheral devices.

Figure 3:
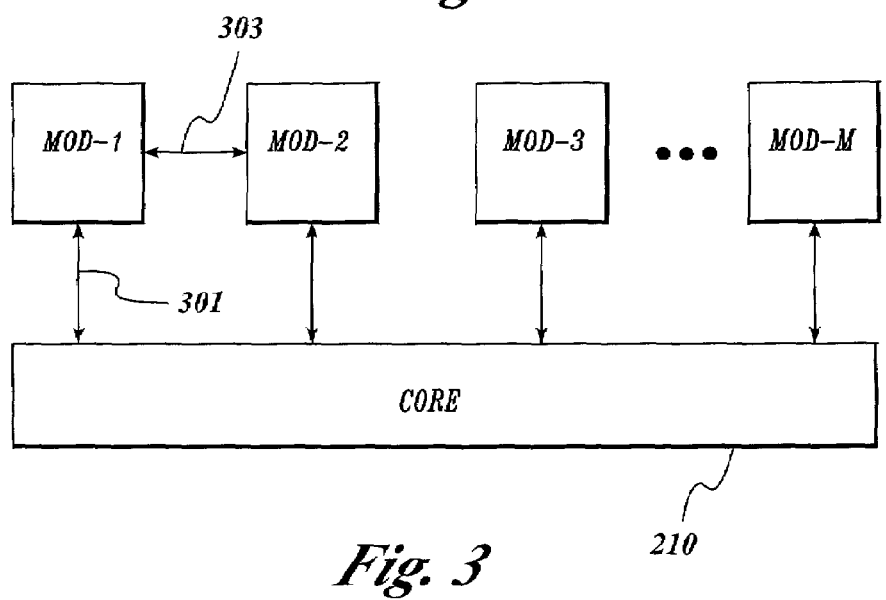
FIG. 3 is a diagram illustrating communication links between modules of a modular BIOS according to one embodiment of the present invention.

FIG. 3 further illustrates functional interconnections between core 210 and firmware modules 212-1 to 212-M and between the firmware modules themselves. In one embodiment, each firmware module 212-1 to 212-M includes a common core/module interface (not shown) for interfacing with core 210; and a common module/module interface (not shown) for interfacing with other firmware modules. For example, core 210 can interface with firmware module 212-1 as indicated by a doubled-headed arrow 301, as well as firmware modules 212-2 to 212-M, using the common core/module interface. In addition, firmware module 212-1 can interface with firmware module 212-2 as indicated by a double-headed arrow 303, using the common module/module interface. Although not shown in FIG. 3, other firmware modules 212-3 to 212-M may also be configured with the common module/module interface to interface with another firmware module. These components are described further below in conjunction with FIG. 6.

Figure 4A:
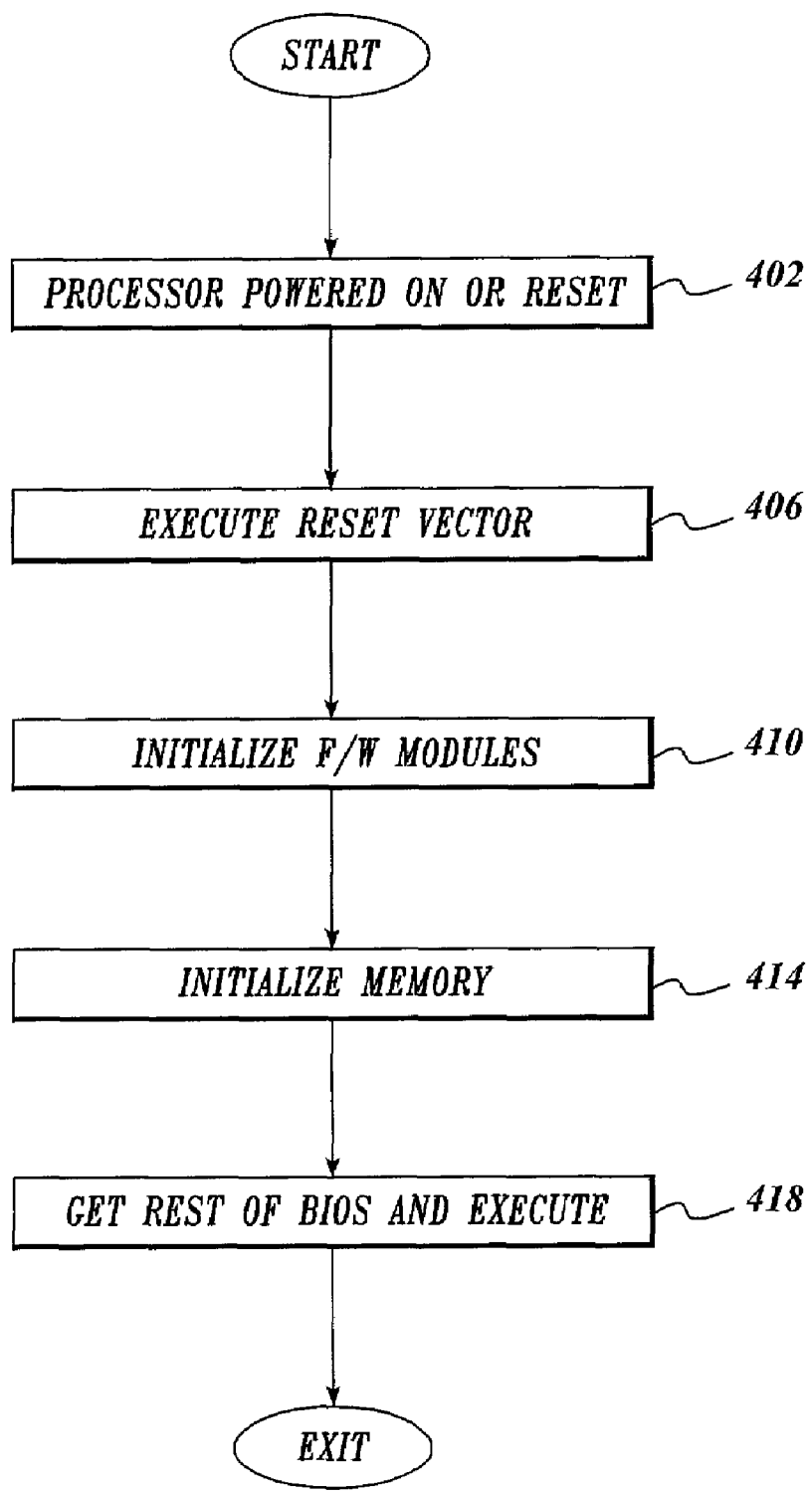
FIGS. 4A and 4B are flow diagrams illustrating a basic initialization operation of a modular BIOS according to one embodiment of the present invention.

FIG. 4A illustrates a basic initialization process performed using modular BIOS 120 (FIG. 1), according to one embodiment of the present invention. In this embodiment, modular BIOS 120 has been loaded into nonvolatile memory 105 (FIG. 1) after undergoing a build process, which serves to compile and link core 210 and firmware modules 212-1 to 212-M in boot block 201 (FIG. 2). Referring to FIGS. 1, 2 and 4, modular BIOS 120 performs this embodiment of this process as follows.

In a block 402, computer system 100 is turned on or reset. In particular, when computer system 100 is turned on, processor 103 begins executing BIOS 120. In one embodiment, a user can actuate a switch to provide power to or reset computer system 100. In many embodiments, a user can also reset the computer system 100 via a user interface (e.g., via a menu selection) provided by the operating system running on computer system 100.

In a block 406, the reset vector is executed. In this embodiment, upon power up (or reset) processor 103 begins executing reset vector 208, which as previously described is the first instruction of BIOS 120. In one embodiment, reset vector 208 typically provides the first instruction of the POST process. In some embodiments, the POST is not executed during a reset.

In a block 410, the firmware modules are then initialized. In one embodiment, processor 103 executes core 210. In this embodiment, core 210 determines the requirements configuration of firmware modules 212-1 to 212-M appropriate to run. Each module, in turn, examines the platform to determine if the hardware it initializes is present for the platform in which BIOS 120 is installed. Block 410 is described in more detail below in conjunction with FIG. 4B.

In a block 414, the memory is initialized. In this embodiment, during processor initialization of firmware modules 212-1 to 212-M, processor execution of one or more of modules 212-1 to 212-M will initialize main memory 107.

In a block 418, the rest of BIOS 120 is received and executed. For example, after main memory is initialized in block 414, processor 103 can retrieve add-on BIOS components (i.e., BIOS extensions) that may reside in other external memory devices (e.g., additional EEPROM or Flash block boot components). BIOS 120 can then complete initialization or allow the operating system to complete initialization.

Figure 4B:
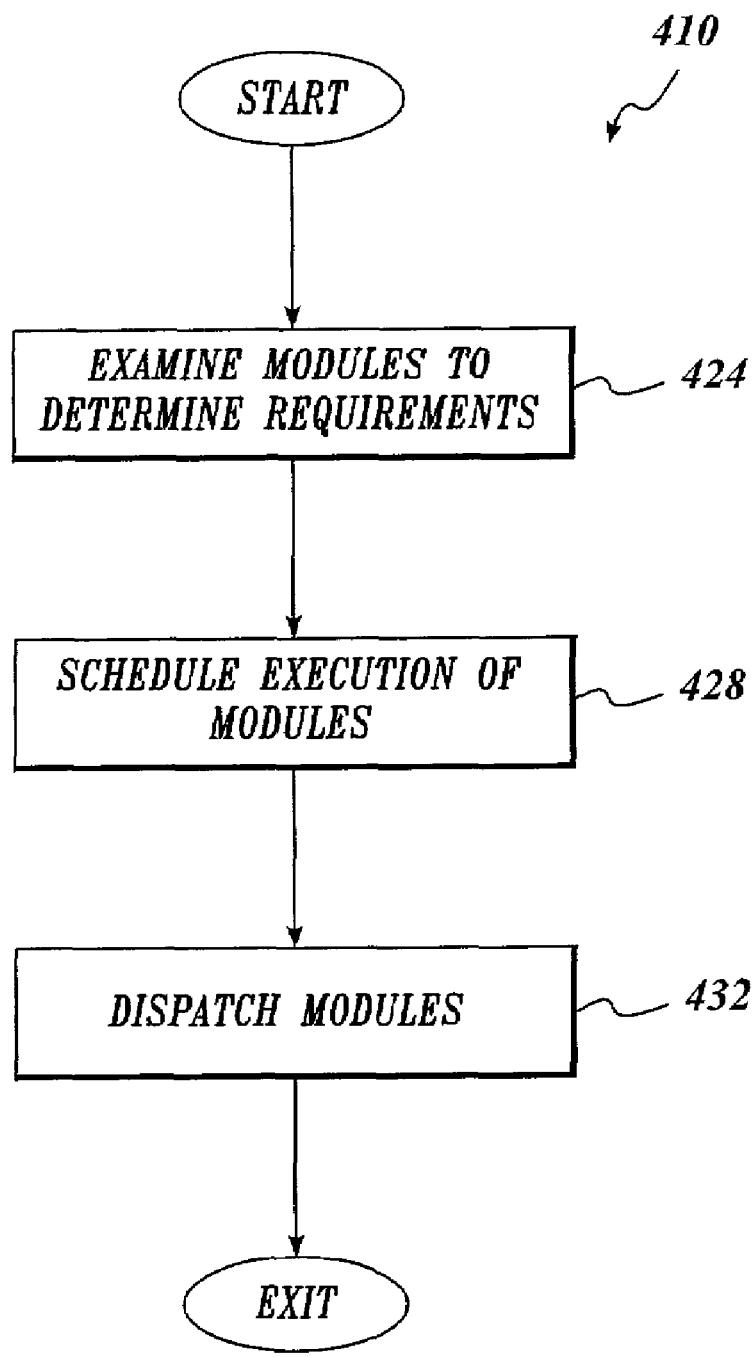

FIG. 4B illustrates block 410 (FIG. 4A) in more detail, according to one embodiment of the present invention. Referring to FIGS. 1, 3 and 4B, this embodiment of block 410 is performed as follows.

In a block 424, firmware modules 212-1 to 212-M are examined to determine the order of which of firmware modules 212-1 to 212-M are required to be dispatched by the core 210 to allow computer system 100 to operate properly. In one embodiment, core 210 includes instructions to check a resource list (described below in conjunction with FIG. 6) of firmware modules 212-1 to 212-M to determine which of these firmware modules are required.

In a block 428, the execution of the required firmware modules is scheduled. In one embodiment, core 210 schedules the execution of the required firmware modules. For example, core 210 can schedule firmware module execution based on the requirements of each firmware module as determined in block 424 above. In one exemplary embodiment, core 210 could schedule firmware modules in the following order: central processor unit (CPU) I/O (input/output) services, PCI configuration access services, ICH (I/O controller hub) component platform initialization services, SMBus (System Management Bus) protocol access services, MCH (memory controller hub) component platform initialization services, etc., which are typically needed early in the initialization process.

In block 432, the required firmware modules are dispatched (i.e., to be executed by processor 103). In one embodiment, core 210 can use a register of processor 103 to store a bit array that indicates which firmware modules are to be dispatched. One exemplary embodiment of this bit array is described further below in conjunction with FIG. 5.

Figure 5:
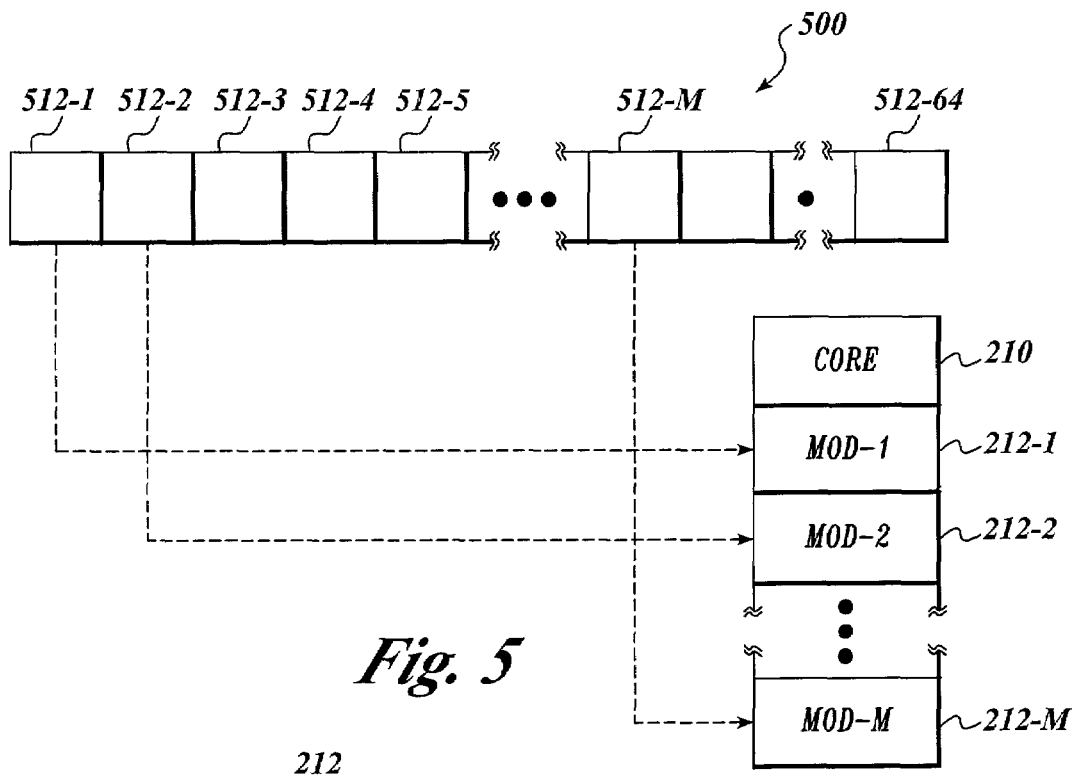
FIG. 5 is a diagram illustrating a data structure for tracking dispatch of firmware modules, according to one embodiment of the present invention.

FIG. 5 illustrates a data structure for tracking dispatch of firmware modules, according to one embodiment of the present invention. In this embodiment, the data structure is a bit array 500 that can be stored using a single 64-bit register of processor 103 (FIG. 1), for a maximum of sixty-four firmware modules in BIOS 120. Each bit of bit array 500 is mapped to a corresponding one of firmware modules 212-1 to 212-M. More particularly, in the embodiment of FIG. 5, a bit 512-1 of bit array 500 corresponds to firmware module 212-1, as indicated by a dashed line 514-1; a bit 512-2 corresponds to firmware module 212-2 as indicated by a dashed line 514-2; ...; and a bit 512-M corresponds to firmware module 212-M as indicated by a dashed line 514-M. In this embodiment, when a bit of bit array 500 is set to a one, then the corresponding firmware module has been dispatched.

Figure 6:
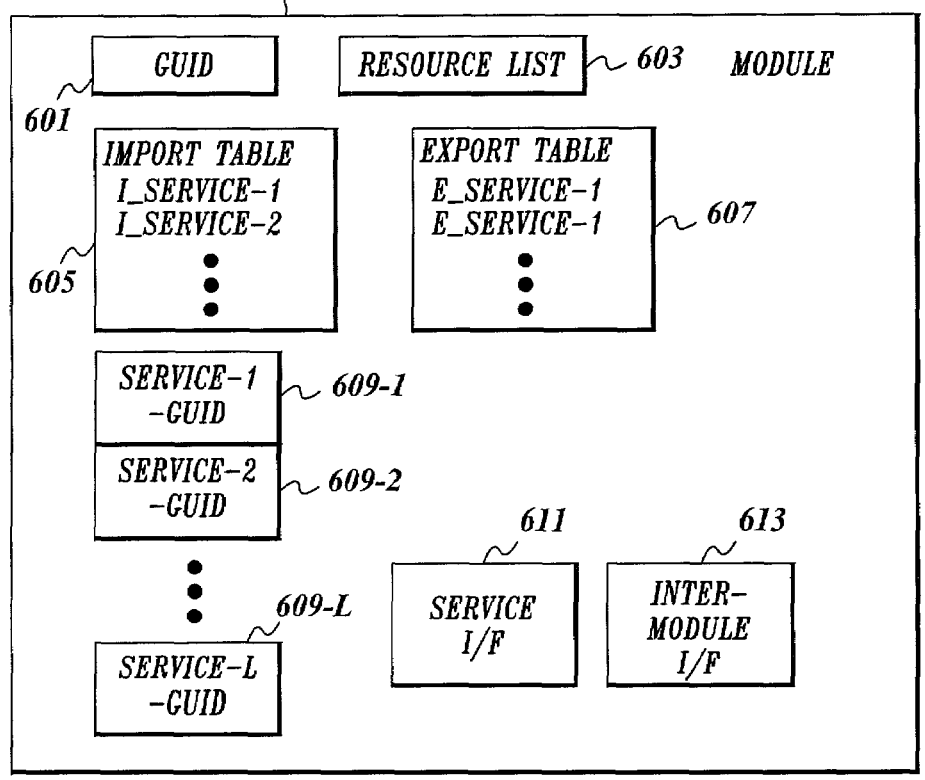
FIG. 6 is a block diagram illustrating components of a firmware module, according to one embodiment of the present invention.

FIG. 6 illustrates components of an exemplary firmware module 212, according to one embodiment of the present invention. That is, some embodiments of firmware modules 212-1 to 212-M (FIG. 2) have the same components as firmware module 212. In this embodiment, firmware module 212 includes a global unique identifier (GUID) 601, a resource list 603, an import table 605, an export table 607, services 609-1 to 609-L, a service interface 611 and an inter-module interface 613. In some embodiments, firmware module 212 is organized as a header and an executable image. The header can include resource list 603, import table 605, export table 607 and a list of services (not shown) provided by firmware module 212. The executable image includes the code for each service. These components of firmware module 212 are described further below.

GUID 601 uniquely identifies firmware module 212. In one embodiment, GUID 601 is a sixteen byte number generated using the Wired For Manageability Baseline Version 2.0 standard when firmware module 212 is created.

Resource list 603 is a list of resources needed by firmware module 212 to properly function. For example, resource list 603 may include the GUIDs of other firmware modules, services or the GUIDs of module-to-module interfaces provided by other firmware modules. Resource list 603 is generated when firmware module 212 is created.

Import table 605 lists the firmware modules and/or services imported or called by firmware module 212. In this exemplary embodiment, firmware module 212, while executing, may call one or more services during the course of execution. The exemplary embodiment of import table 605 in FIG. 6 shows several services that can be called by firmware module 212, listed as I_Service-1, I_Service-2, and so on. One embodiment of import table 605 is described further below in conjunction with FIG. 7A.

Export table 607 lists the firmware modules and/or services that can be called by other firmware modules. In this embodiment, export table 607 is filled during the build process (mentioned above in conjunction with FIG. 4A). For example, during a build process, the process selects a firmware module and examines all of the remaining firmware modules to determine which of these firmware modules calls the selected firmware module by examining the remaining firmware module's import table. For each firmware module consuming this module's export interface, the consuming firmware module's import table is then modified to include the correct physical address of the exported interface. The build process then selects another firmware module and performs another pass through the firmware modules, and so on until all of the import tables of all of the firmware modules have been filled.

One embodiment of the build process is described further below in conjunction with FIG. 8.

As mentioned above, firmware module 212 includes service 609-1 to service 609-L. A firmware module may have only one service in other embodiments. In this embodiment, each service also has a GUID that uniquely identifies the service. In some embodiments, multiple firmware modules may perform the same service and, thus, have the same GUID for that service. Although these services may have the same GUID and perform the same function, they are different from each other in that they are configured for a particular environment or hardware configuration. In such a case, the service that is actually executed is the one configured for the platform's environment or hardware.

Service interface 611 serves as the interface of firmware module 212 to core 210 (FIG. 2). For example, for core 210 to make a call to firmware module 212, core 210 would execute an instruction that contains information such as the physical address of firmware module 212 and a return address to core 210. Service interface 611 is a standard interface for all firmware modules so that core 210 can call any firmware module (from any vendor). Thus, core 210 can pass parameters, etc., in a single format to any firmware module, which in turn will be properly operated on by that firmware module.

Inter-module interface 613 serves as the interface of firmware module 212 to another firmware module. For example, for firmware module 212 to make a call to another firmware module, firmware module 212 would execute an instruction that contains information such as the physical address of the other firmware module and a return address of firmware module 212 or, in some embodiments, of core 210 in a daisy-chaining process (described further below in conjunction with FIG. 8). In some embodiments, interfaces 611 and 613 are the same.

FIG. 7A illustrates import table 605, according to one embodiment of the present invention. As shown by FIG. 7A, exemplary import table 605 contains one or more services (i.e., I_Service-1 to I_Service-X) that firmware module 212 may call while it is executing. In this embodiment, each I_Service has a name, a set of flags, and an address. In one embodiment, the name is the GUID for the I_Service. The flags are bits that are used to indicate whether predetermined configuration attributes have been set (e.g., daisy-chaining, Stub interface, Internal interface, etc.). The address is a physical memory address representing the start address of firmware module to be called summed with the offset of the service from the start address. This entry of import table 605 is filled during the build process. For example, the build tool or application can determine the start address of firmware module to be called and add this address to the offset, which the build tool can retrieve from the export table of the firmware module to be called.

FIG. 7B illustrates export table 607, according to one embodiment of the present invention. As shown by FIG. 7B, exemplary export table 607 contains one or more services (i.e., E_Service-1 to E_Service-Y). In this embodiment, each E_Service has a name, a set of flags, and an offset. In one embodiment, as in an I_Service (FIG. 7A), the name is a GUID and the flags are bits that are used to indicate whether predetermined configuration attributes have been set (e.g., daisy-chaining, loopback interfaces, etc.). The address is a physical memory address representing the offset of the E_Service from the start address of firmware module 212. This entry of export table 607 is filled by the compiling and linking of firmware module 212. This offset is available to the build tool (mentioned above in conjunction with FIG. 7A) during the build process to fill import table 605.

Figure 8:
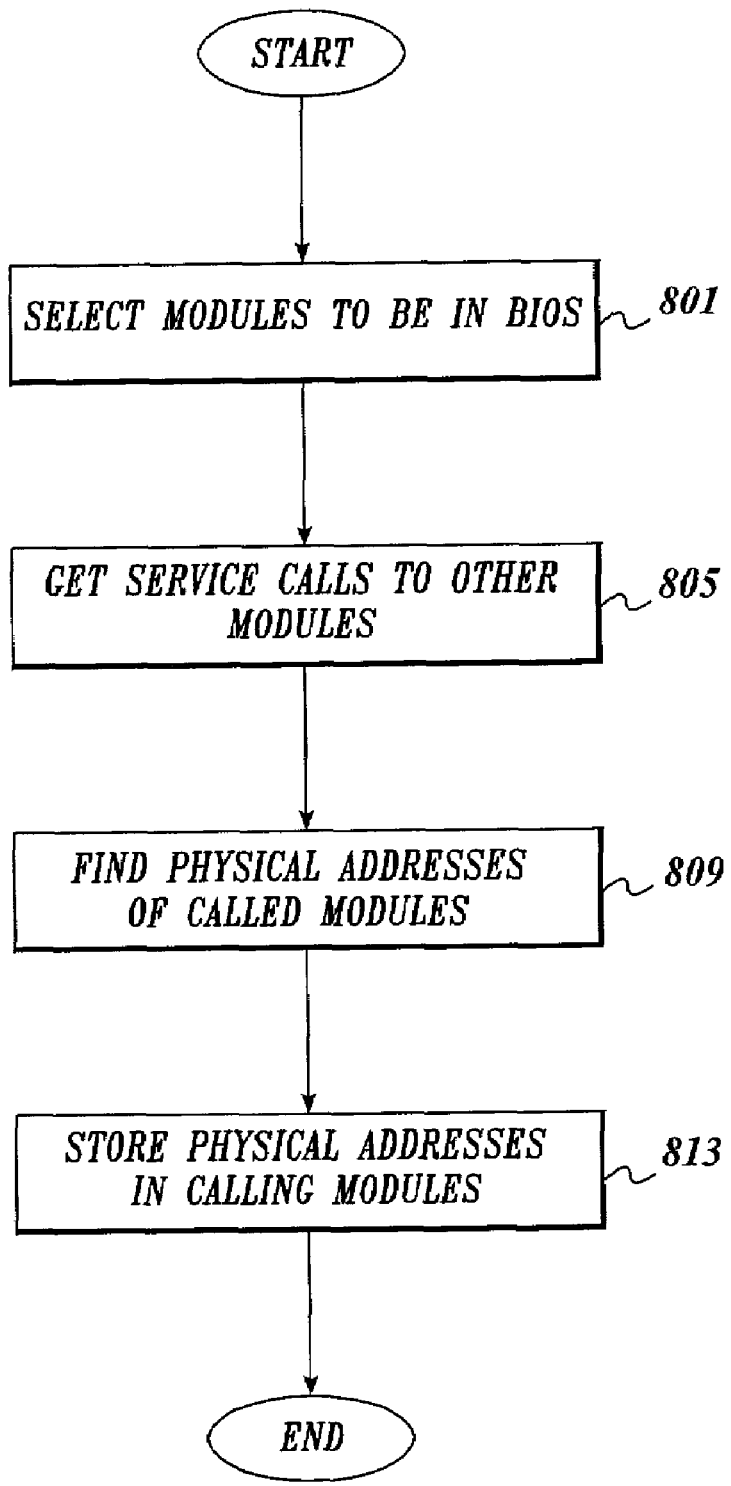
FIG. 8 is a flow diagram illustrating a process for linking firmware modules in the BIOS, according to one embodiment of the present invention.

FIG. 8 illustrates a build process, according to one embodiment of the present invention. In one embodiment, the build process is performed by the BIOS vendor using a build tool that serves in effect to compile and link the firmware modules and core of the BIOS.

In a block 801, firmware modules to be included in the BIOS are selected. In one embodiment, the BIOS vendor gathers firmware modules from various sources. This feature advantageously provides flexibility, and can help the BIOS vendor avoid the need to develop its own firmware module or modules. In addition, once a firmware module has been tested and verified as compliant, the testing requirements for the BIOS vendor are simplified since the firmware module is demonstrated to be reliable. Still further, this feature can allow a BIOS vendor to quickly provide BIOSs for new platforms because very likely only a small portion of the BIOS code will need to be developed. These selected firmware modules are then placed in a file and operated on by a build tool.

In a block 805, the service calls by each selected firmware module are retrieved. In one embodiment, for each firmware module, the build tool gets the service calls from the firmware module's import table. For example, in a first pass, the build tool examines the import table of a first firmware module (selected in block 801) and gets the start address of all of the firmware modules that the first firmware module may call. The build tool may then examine the import table of a second firmware module to get the start addresses of all of the firmware modules that the second firmware module may call, and so on.

In a block 809, the physical addresses of each called service or firmware module is determined. In one embodiment, the build tool examines the export table of the called firmware modules. As previously described, the export table of each firmware module includes the offset of each service that firmware module provides. Thus, the build tool can determine the physical address of a called service by adding the offset of the called service and the start address of the firmware module containing the service.

In a block 813, the physical addresses of the called service or firmware module is stored. In one embodiment, the build tool stores these physical addresses in the import table of the appropriate firmware modules. For example, in one embodiment, the build tool may make a first pass through the firmware modules by performing blocks 805, 809 and 813 to fill the import table of a first firmware module. The build tool may then make a second pass through all of the firmware modules by performing blocks 805, 809 and 813 to fill the import table of a second firmware module, and so on until the import tables of all of the firmware modules selected in block 801 have been filled.

Figure 9:
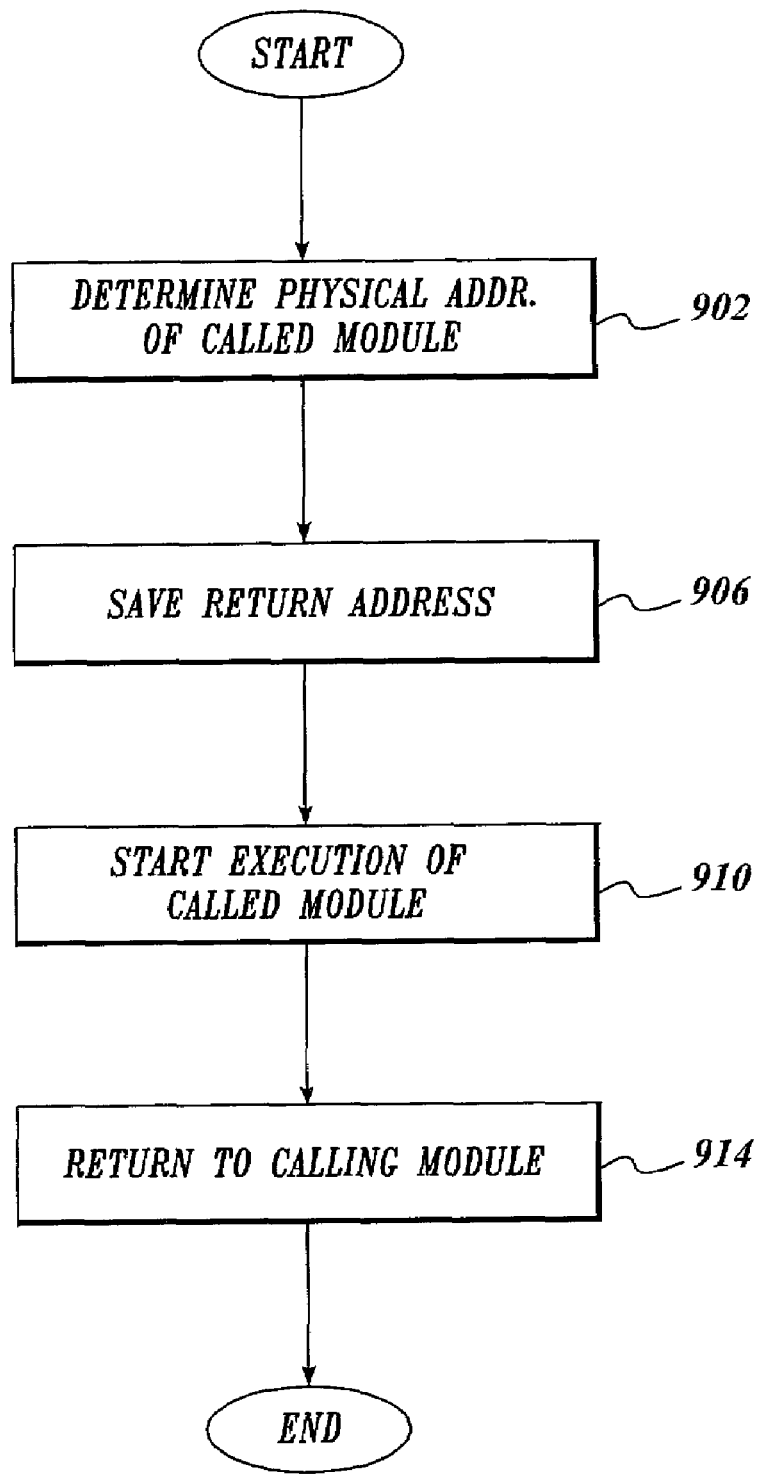
FIG. 9 is a flow diagram illustrating a module call operation, according to one embodiment of the present invention.

FIG. 9 illustrates a call operation, according to one embodiment of the present invention. A calling agent (e.g., core 210 or one of firmware modules 212-1 to 212-M of FIG. 2), while executing, may make a call to a service of another of firmware modules 212-1 to 212-M. In response, this called service would then be executed, with the operational flow returning to the calling agent when the called service completes execution. One embodiment of this call operation is described below.

In a block 902, the physical address of the firmware module or service to be called is determined. In one embodiment, the calling agent looks up the physical address of the firmware module or service in a table maintained by the calling agent. For example, a calling firmware module would look up the physical address in its import table. Core 210 has a table of the physical addresses of all of the firmware modules and services that was filled during the build process (see FIG. 8). Core 210 would look up the physical address of the called service in this table.

In a block 906, the calling agent saves the return address (i.e., the address to which execution returns after execution of the called service) so that the operational flow can return to the point it left off during execution of the calling agent. In one embodiment, the return address is saved in a register of processor 103 (FIG. 1). Thus, in one embodiment, only two registers of processor 103 are used during the pre-memory execution of BIOS 120 (FIG. 2); i.e., one for bit array 500 and one for the return address. Thus, this embodiment advantageously frees the other registers of processor 103 for other purposes. In other embodiments, block 906 may be performed before block 902.

In a block 910, the called service is executed. More particularly, in this embodiment, the calling agent causes processor 103 (FIG. 1) to execute the instruction stored at the physical address found in block 902 (i.e., the beginning instruction of the called service). After execution of the called service is completed, a block 914 is performed in which the operational flow returns to the calling agent using the return address that was saved in block 906.

Figure 10:
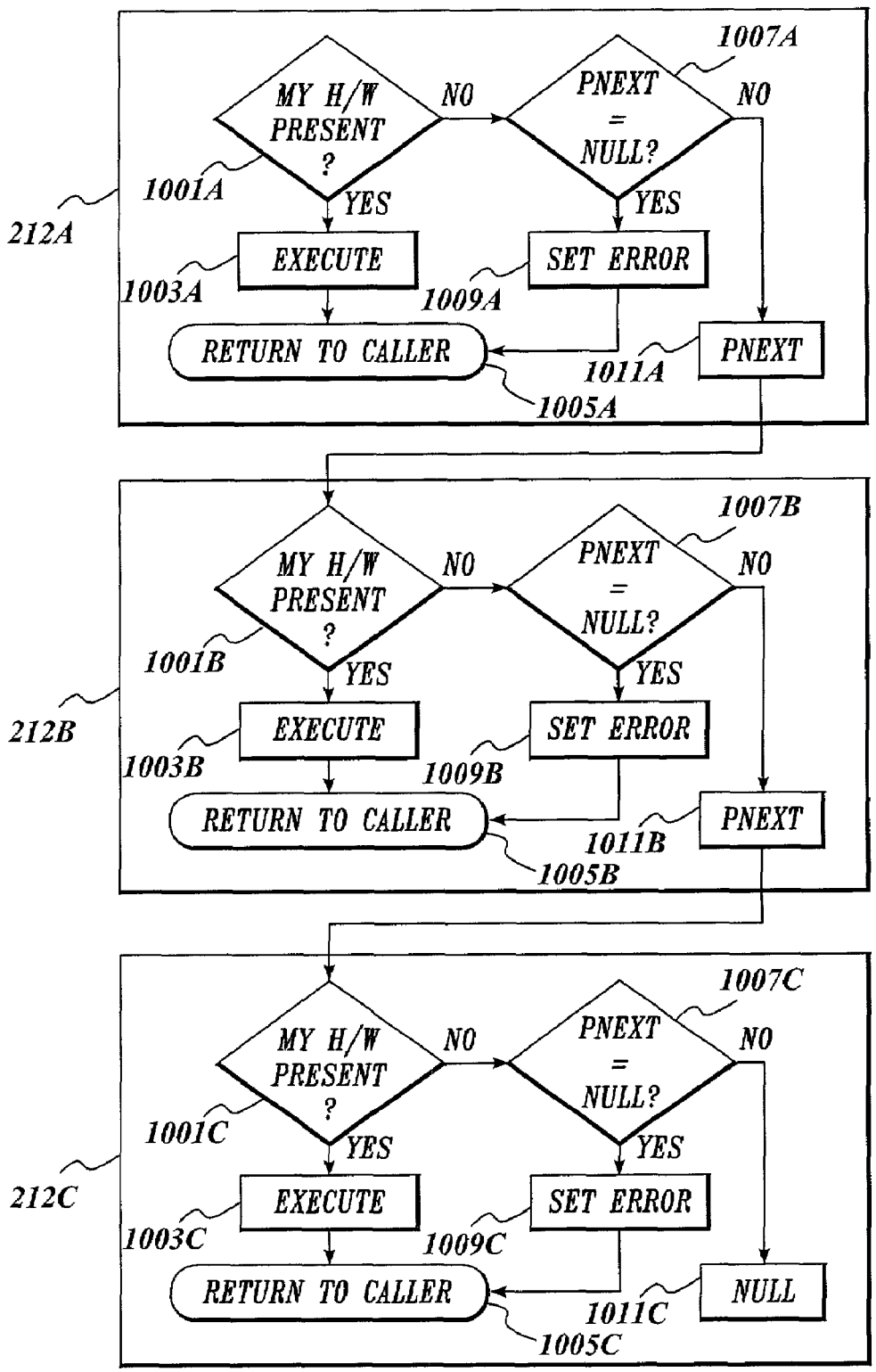
FIG. 10 is a flow diagram illustrating a daisy chaining operation, according to one embodiment of the present invention.

FIG. 10 illustrates a daisy chaining operation, according to one embodiment of the present invention. This daisy chaining feature allows BIOS 120 (FIG. 1) to be executed without specific knowledge of the hardware present in the platform. For example, the daisy chaining feature is advantageously used when BIOS 120 may be used in multiple platforms. In particular, BIOS 120 would include multiple firmware modules, some of which are designed for a particular hardware component that may or may not be present in the platform. For example, the platform vendor may select one of several different hardware components that perform the same function, each having a firmware module to operate the hardware component. In this embodiment, the firmware modules for such hardware components have the same GUID identifying the service that operates the hardware component. The firmware module corresponding to the actual hardware component present in the platform must be executed when such GUID service is called. Daisy chaining advantageously allows the firmware modules themselves determine which firmware module should be executed for the hardware component present in the platform.

One embodiment of the daisy chaining operation is described below using exemplary firmware modules 212A, 212B, and 212C. In this example, the import and export tables of firmware modules 212A-212C have a "daisy chain" flag (see FIGS. 7A and 7B) set for the particular service corresponding to the "multi-hardware component" GUID. During the build process, when the build tool first finds a firmware module that has the daisy chain flag set (i.e., firmware module 212A in this example), the build tool then checks the import tables of the remaining firmware modules until it finds a service having the same GUID. In this example, the next firmware module is firmware module 212B. The build tool stores the physical address of that service in a variable (variable PNEXT in this example) of firmware module 212A. The build tool repeats this process to find the physical address of a next firmware module (i.e., firmware module 212C in this example) to daisy chain to firmware module 212B. In this example, only firmware modules 212A-212C have services with the same GUID, so the build tool will not find a physical address to load in variable PNEXT of firmware module 212C. Thus, variable PNEXT is set to zero (i.e., null) in this example. Other services may have a number of daisy-chained firmware modules that is different from that of this example (i.e., any number greater than or equal to two). One embodiment of daisy chaining operates as follows.

In a block 1001A, while firmware module 212A is executing, firmware module 212A determines whether the hardware component the service is designed to operate with is present in the platform. In one embodiment, firmware module 212A performs this operation by checking a configuration register maintained in hardware.

If the hardware component is present, then firmware module 212A continues executing to perform the called service in a block 1003A. After firmware module 212A completes execution, the operational flow returns to the calling agent in a block 1005A.

However, if in block 1001A the hardware component is not present in the platform, the operational flow proceeds to a block 1007A. In block 1007A, the process determines whether there is a next firmware module in the daisy chain. In one embodiment, firmware module 212A checks variable PNEXT to see if it holds a physical address. For example, firmware module 212A can test if variable PNEXT is null (thereby indicating there is not a next link in the daisy chain).

If variable PNEXT is null, the operational flow proceeds to a block 1009A in which firmware module 212A indicates that an error has occurred. In one embodiment, firmware module 212A causes an error message to be displayed via a display or monitor (not shown) of computer system 100 (FIG. 1). The operational flow then proceeds to block 1005A (described above).

In contrast, if variable PNEXT is not null (i.e., holds a physical address of the next firmware module in the daisy chain), the operational flow jumps to the physical address loaded in variable PNEXT in a block 1011A to execute the next firmware module in the daisy chain. In this exemplary embodiment, the next firmware module is firmware module 212B.

Firmware module 212B operates in essentially the same manner as firmware module 212A described above. That is, the description above for firmware module 212A applies equally well to firmware module 212B by replacing the letter "A" appended to the reference numbers with the letter "B".

Firmware module 212C also operates in essentially the same manner as firmware module 212A. However, since firmware module 212C is the last link of the daisy chain in this exemplary embodiment, variable PNEXT of firmware module 212C should be set to NULL during the build process. Thus, block 1011C would not be performed in normal operation.

Figure 11:
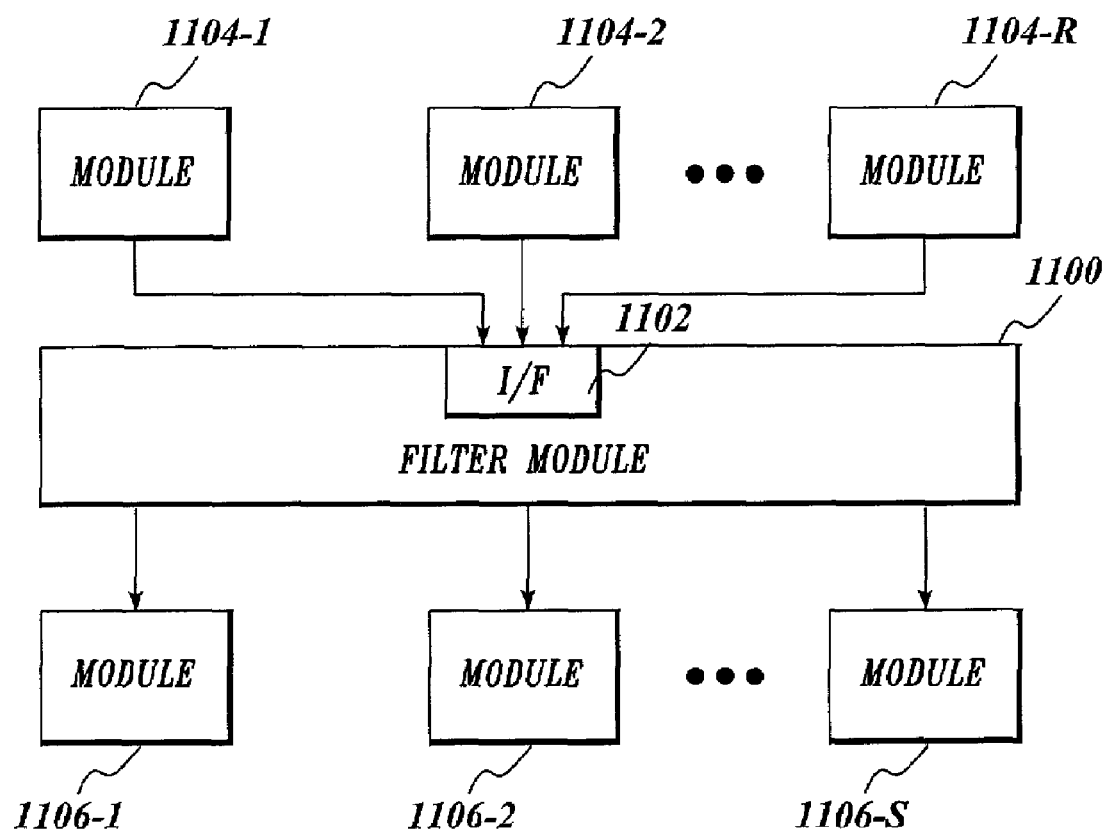
FIG. 11 is a diagram illustrating a filter module, according to one embodiment of the present invention.

FIG. 11 illustrates a filter module 1100 for use in BIOS 120 (FIG. 1), according to one embodiment of the present invention. Filter module 1100 is platform specific and can be advantageously used in platforms having two or hardware components (having different GUIDs) that perform similar functions. Such a platform may be designed so that a particular one of these hardware components is used, depending on the calling module and/or the called service. In this embodiment, a filter module for a different platform would have the same GUID.

Referring again to FIG. 11, filter module 110 is operatively interconnected with other firmware modules of BIOS 120 (FIG. 1) as follows. Filter module 1100 has an interface 1102 that can be called by firmware modules 1104-1 to 1104-R. Although at least three "calling" firmware modules are shown in FIG. 11, in some embodiments of BIOS 120, there can be as little as one calling firmware module for use with filter module 1100. Filter module 1100 is configured by the platform vendor to be able to call firmware modules 1106-1 to 1106-S. Although at least three "called" firmware modules are shown, there can be as few as one "called" firmware module for use with filter module 1100 in other embodiments of BIOS 120.

In operation, firmware modules 1104-1 to 1104-R can call a service to be provided by one of firmware modules 1106-1 to 1106-S. Firmware modules 1104-1 to 1104-R do not need to know the GUIDs of the services provided by firmware modules 1106-1 to 1106-S. Rather, firmware modules 1104-1 to 1104-R are configured with the GUID of filter module 1100, which these "calling" firmware modules use to call filter module 1100. Filter module 1100 processes each received call and in turn calls the appropriate one of "service" firmware modules 1106-1 to 1106-S, which can depend on the configuration of the platform, the "calling" firmware module and/or the "service" firmware module.

For example, the hardware components may be System Management Bus (SMBus) controllers. One platform may be configured to use a single SMBus controller while another platform may be configured to use one SMBus controller to access processor 103 (FIG. 1) and another SMBus controller to access memory modules. In this embodiment, the "calling" firmware modules 1104-1 to 1104-R are configured to simply call an SMBus controller service by using the GUID of filter module 1100, without having to have knowledge of the multiple SMBus controller services. The platform specific filter module 1100 is configured to interpret calls to its GUID and, in response, call the appropriate SMBus controller service of firmware modules 1106-1 to 1106-S. Thus in this example, the process of calling an appropriate one of the various available SMBus services is transparent to "calling" firmware modules 1104-1 to 1104-R, which only have to be configured to call filter module 1100. As a result, only filter module 1100 needs to be platform specific, while firmware modules 1104-1 to 1104-R and firmware modules 1106-1 to 1106-S can be non-plafform specific for use in various platforms.

Embodiments of a system and method for linking firmware modules in a pre-memory environment are described herein. In the following description, numerous specific details provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the following description, for purposes of explanation, specific nomenclature may be set forth to provide a thorough understanding of the present invention. However, it will be apparent to one skilled in the art after reading the description that these specific details are not required in order to practice the present invention.

Some portions of the detailed descriptions that follow may be presented in terms of algorithms and symbolic representations of operations on information stored in a computer memory. These algorithmic descriptions and representations can be used by those skilled in the art to convey the substance of their work to others skilled in the art. An algorithm is here, and generally, conceived to be a self-consistent sequence of steps or operations leading to a desired result. These steps or operations may require physical manipulations of physical quantities. Usually, though not necessarily, these quantities take the form of electrical, magnetic or electromagnetic signals capable of being stored, transferred, combined, compared or otherwise manipulated. These signals are commonly referred to here, and generally, as bits, bytes, words, values, elements, symbols, characters, terms, numbers or the like.

Unless specifically stated otherwise, terms such as "processing", "computing", "calculating", "determining", "displaying" or the like refer to actions and processes of a computer system, or other similar electronic computing device. In particular, these actions and processes manipulate and transform data represented as physical quantities (as described above) within the computer system's registers and memories into other data similarly represented as physical quantities with within the computer system's memories or registers or other information storage, transmission or display devices.

The present invention also relates to one or more apparatus for performing the operations described herein. An apparatus may be specially constructed for the required purposes, or include a general-purpose computer selectively activated or configured by a computer program stored in the computer. Such a computer program may be stored in a computer readable storage medium such as, but not limited to, any type of disk including floppy disks, optical disks, compact disks (CDs) and magnetic-optical disks. Other storage mediums include: read only memories (ROMs) including erasable and electrically erasable programmable ROMs (EPROMs and EEPROMs); random access memories (RAMs) including static and dynamic RAMs; and magnetic or optical cards.

Algorithms and displays presented herein are not inherently related to any particular computer or other apparatus unless specifically stated otherwise. Various general-purpose systems, as well as specialized apparatus, may be used with programs in accordance with the teachings herein. In addition, the present invention is not described with reference to a particular programming language. In light of the present disclosure, those skilled in the art can use a variety of programming languages to implement the teachings of the present disclosure without undue experimentation.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method comprising: executing a core module; initializing a plurality of firmware modules by the core module, wherein initializing comprises: examining at least two firmware modules to determine a required order of dispatch of the at least two firmware modules; dispatching an earlier of the at least two firmware modules by the core module and then dispatching a later of the at least two firmware modules by the core module; after the initializing of the plurality of firmware modules, initializing a system memory; and invoking a function contained in a third firmware module by the earlier of the at least two firmware modules during a dispatch of the earlier of the at least two firmware modules or by the later of the at least two firmware modules during a dispatch of the later of the at least two firmware modules, each of the at least two firmware modules including an interface to call the function contained in the third firmware module, wherein each of the plurality of firmware modules includes a daisy chain flag corresponding to an absent hardware component in an import table.

2. The method of claim 1, wherein the examining comprises checking a resource list of each of the at least two firmware modules.

3. The method of claim 1, wherein the initializing of the plurality of firmware modules further comprises: determining a requirements configuration of the plurality of firmware modules appropriate to run; and examining a platform to determine whether a hardware to be initialized by a firmware module is present in the platform.

4. The method of claim 1, further comprising:
    marking a data structure after dispatching a firmware module, wherein the data structure is to indicate whether the firmware module has been dispatched.

5. The method of claim 4 wherein the data structure is a bit array.

6. The method of claim 4 wherein the data structure is held in a processor register.

7. The method of claim 1,
    wherein the third firmware module is dispatched before the function contained in the third firmware module is invoked.

8. The method of claim 7 wherein the invoking comprises: scanning a daisy chain of firmware modules to find a module that operates with a hardware component present in a platform; and invoking the function if the module is found.

9. A computer-readable storage medium containing instructions to cause a programmable processor to perform operations comprising: determining dependencies among a plurality of firmware modules by a separate core module based on information about services imported from an import table of each of the plurality of firmware modules and services exported from an export table of each of the plurality of firmware modules before dispatching the plurality of firmware modules by the separate core module, and the services imported from the import table of each of the plurality of firmware modules dispatched by the separate core module are provided in another firmware module of the plurality of firmware modules dispatched by the separate core module; dispatching each of the plurality of firmware modules in an order that satisfies the dependencies; and initializing a volatile system memory after dispatching the plurality of firmware modules.

10. The computer-readable storage medium of claim 9, wherein information about services imported and exported by a firmware module comprises: an import table of the firmware module containing at least one service that may be called by the firmware module; or an export table of the firmware module containing at least one service provided by the firmware module.

11. The computer-readable storage medium of claim 9, containing additional instructions to cause the programmable processor to perform operations comprising:
    maintaining a data structure to indicate which firmware modules of the plurality of firmware modules have been dispatched, wherein the data structure is kept in a register of the programmable processor.

12. The computer-readable storage medium of claim 9, wherein dispatching a firmware module comprises saving a return address in a processor register and executing a beginning instruction of the firmware module.

13. A system comprising: a hardware component to perform a function; a volatile memory that can store data after the volatile memory is initialized; and a non-volatile memory containing a Basic Input-Output System ("BIOS") including a BIOS core and a plurality of firmware modules, wherein two of the plurality of firmware modules are to initialize hardware components to perform the function, and one of the two of the plurality of firmware modules is to initialize an absent hardware component that is not present in the system by iterating through each of the plurality of firmware modules within the BIOS to determine whether the absent hardware component is present, each of the plurality of firmware modules including a daisy chain flag corresponding to the absent hardware component in an import table, and the two of the plurality of firmware modules are to be dispatched before the volatile memory is initialized.

14. The system of claim 13 wherein the volatile memory is a Random Access Memory ("RAM").

15. The system of claim 13 wherein the non-volatile memory is at least one of a Read-Only Memory ("ROM") or a Flash memory.

* * * * *